(12) United States Patent
Donohue

(10) Patent No.: US 7,467,718 B1
(45) Date of Patent: Dec. 23, 2008

(54) COMBINATION STRAINER AND SERVICE BOWL

(76) Inventor: Laurie Donohue, P.O. Box 146, Marlborough, NH (US) 03455

(*) Notice: Subject to any disclaimer, the term of this patent is extended or adjusted under 35 U.S.C. 154(b) by 0 days.

(21) Appl. No.: 12/103,972

(22) Filed: Apr. 16, 2008

(51) Int. Cl.
*B01D 35/28* (2006.01)
*B01D 29/00* (2006.01)

(52) U.S. Cl. .................. 210/464; 210/473; 210/499; 210/498; 220/607; 220/676; 99/490; 99/508

(58) Field of Classification Search ............... None
See application file for complete search history.

(56) References Cited

U.S. PATENT DOCUMENTS

| 1,688,846 | A | | 10/1928 | Andrews |
| 2,633,428 | A | | 12/1953 | Hoagland |
| D185,399 | S | | 6/1959 | Tupper |
| 3,091,339 | A | * | 5/1963 | Marra et al. ............... 210/232 |
| 3,300,048 | A | | 1/1967 | Pollock |
| 4,320,540 | A | * | 3/1982 | Leavens ..................... 4/287 |
| 4,626,352 | A | | 12/1986 | Massey et al. |
| 5,369,815 | A | * | 12/1994 | Martin ......................... 4/287 |
| 5,373,779 | A | | 12/1994 | Grusin |
| 5,535,455 | A | * | 7/1996 | Liu ............................ 4/287 |
| 5,771,792 | A | | 6/1998 | Chen |
| 5,957,038 | A | | 9/1999 | Shimazaki |
| 6,568,314 | B1 | | 5/2003 | Stepanova |
| 6,949,190 | B2 | | 9/2005 | Hutzler |
| 7,025,213 | B2 | | 4/2006 | Chen |
| 2005/0155142 | A1 | * | 7/2005 | Colpitts et al. ............ 4/287 |
| 2005/0205487 | A1 | | 9/2005 | Rogers |
| 2006/0070944 | A1 | | 4/2006 | Ahn et al. |

FOREIGN PATENT DOCUMENTS

EP 1348369 A1 10/2003

* cited by examiner

*Primary Examiner*—Krishnan S Menon
(74) *Attorney, Agent, or Firm*—Luis Figarella

(57) ABSTRACT

A device that combines the functions of a colander or strainer with a leak-proof bowl. This allows you to use the same container to rinse a product, then prepare, condiment, potentially serve the dish (whether under wet, moist or dry conditions) and even store it afterwards. A method for using the combined purpose container.

4 Claims, 6 Drawing Sheets

COMBINATION STRAINER AND SERVICE BOWL

FIELD OF THE INVENTION

This invention relates to utensils used in preparation and service procedures, including food preparation; like rinsing cooked pasta, raw and cooked vegetables, raw and cooked salads and other similar dishes. This invention relates to a colander/strainer and container combination which allows you to use the same utensil to rinse a product, then make it leak-proof and prepare a product (whether under wet, moist or dry conditions) within it.

DESCRIPTION OF THE RELATED ART

When preparation requires rinsing or draining one or more of the ingredients, multiple utensils are typically required, particularly if the preparation requires rinsing an ingredient and later adding liquids or sauces. Typically a colander or strainer is used to wash or rinse ingredients like vegetables or fruits, which are then poured onto one or more containers. In other cases, items such as pasta or vegetables may be cooked on a pot or pan, poured on a colander or strainer for draining or rinsing, then transferred to a container for further preparation or serving. In many cases, yet a different container is used to then serve the item.

This need in certain preparations to rinse, dry and then further on wet the items being prepared again generates a lot of dirty dishes if a new one is used in every preparation. With the cook (in many cases also the dishwasher) ending up with extra items to clean and deal with either during the preparation and/or post event cleaning. Besides the extra cleaning, large containers occupy significant volume, hence space.

There is a need for a combination strainer and container apparatus, requiring a simple operation to convert from strainer to leak-proof container, that would allow you to limit the number of items that need to be cleaned, placed and operated on during the cooking process, without creating a mess or hazardous condition.

SUMMARY OF THE INVENTION

This section is for the purpose of summarizing some aspects of the present invention and to briefly introduce some preferred embodiments. Simplifications or omissions may be made to avoid obscuring the purpose of the section. Such simplifications or omissions are not intended to limit the scope of the present invention.

It is the object of the invention to provide a single preparation apparatus that can be used to wash and drain ingredients, then without removing the contents and via a simple mechanical motion, become a leak-proof container on which the contents can be further manipulated (using both dry and wet elements), presented and even stored. The above may be accomplished for foods, as well as for many other processes of a non-food preparation nature, where minimizing the number of extra containers is also valuable.

The above and other objects of the invention are accomplished with an apparatus having two complementary nesting shaped sections that fit within each other. The internal one is built to operate as a strainer or colander (collectively called a colander/strainer), having openings within it walls to allow for liquids to seep through them, and a protrusion below it that acts as a mating or coupling connection to an outer container. The outer or external container is equipped with solid walls, a central coupling mechanism designed to mate with the inner container protrusion, and drain means within it to allow the liquid poured into the cavity to either drain or collect, depending on the position of the inner/outer pieces to each other.

In this fashion, the combination can act as either a colander/strainer or a leak-proof food preparation (and even serving) container. In fact, when equipped with a lid, the combination container may further be used as a leak-proof storage container. Thus this becomes a device that combines the functions of a colander or strainer with a leak-proof serving and storage container. This allows you to use the same container to rinse a product, then prepare, condiment, potentially serve the dish (whether under wet, moist or dry conditions) and even store it afterwards.

In order to facilitate the rotation of the inner container to the outer container, either or both may be equipped with some form of grip assistance (e.g. handles, protrusions or openings) that may be used to exert force on one portion relative to the other. In such a fashion, the inner portion may be rotated to the open or close position (or pushed/pulled in the down/up position). In the preferred embodiment, they do not protrude above the upper datum plane formed by the top of both containers, so that a lid may be placed over both containers and create a sealed environment in which to store ingredients.

In an alternate embodiment, the central colander may act as a drain when in the up position, and when pushed down, seal the drain and create a similar leak-proof container for material preparation.

As an option to all embodiments, the walls of the outer container may feature raised "bumps" that match the position of the drain holes in the inner container portion when in the leak-proof position. Such an arrangement would present the food inside the combination with a smooth surface, and minimize the amount of condiment and/or prepared food that may be trapped by the colander/strainer openings and/or the residual gap between the inner and outer containers.

Other features and advantages of the present invention will become apparent upon examining the following detailed description of an embodiment thereof, taken in conjunction with the attached drawings.

BRIEF DESCRIPTION OF THE DRAWINGS

The above and other objects of this invention can be better understood when the specification is read in view of the drawings, wherein.

DETAILED DESCRIPTION OF THE PREFERRED EMBODIMENT

As used throughout this specification and in the claims, the term strainer is intended to relate to a colander or any other suitable straining device that is used to drain a liquid (e.g. water, oil, vinegar) from a solid (e.g. rice, pasta, vegetables, meats), although by no means is the invention limited to food items only.

As used throughout this specification and in the claims, the terms bowl and container are intended to be interchangeable with each other, and not limited to circumferential shapes. We refer to containers where the internal and external portions complement each other by fitting within each other. In addition, the term container, individually or collectively, is intended to represent vessels, pots or any other suitable utensil for housing liquids and/or solids. In the preferred embodiment, all components are manufactured through a combination of polymerization process (commonly referred to as plastics), although combinations of plastics, metal and other materials is possible.

Figure 1:
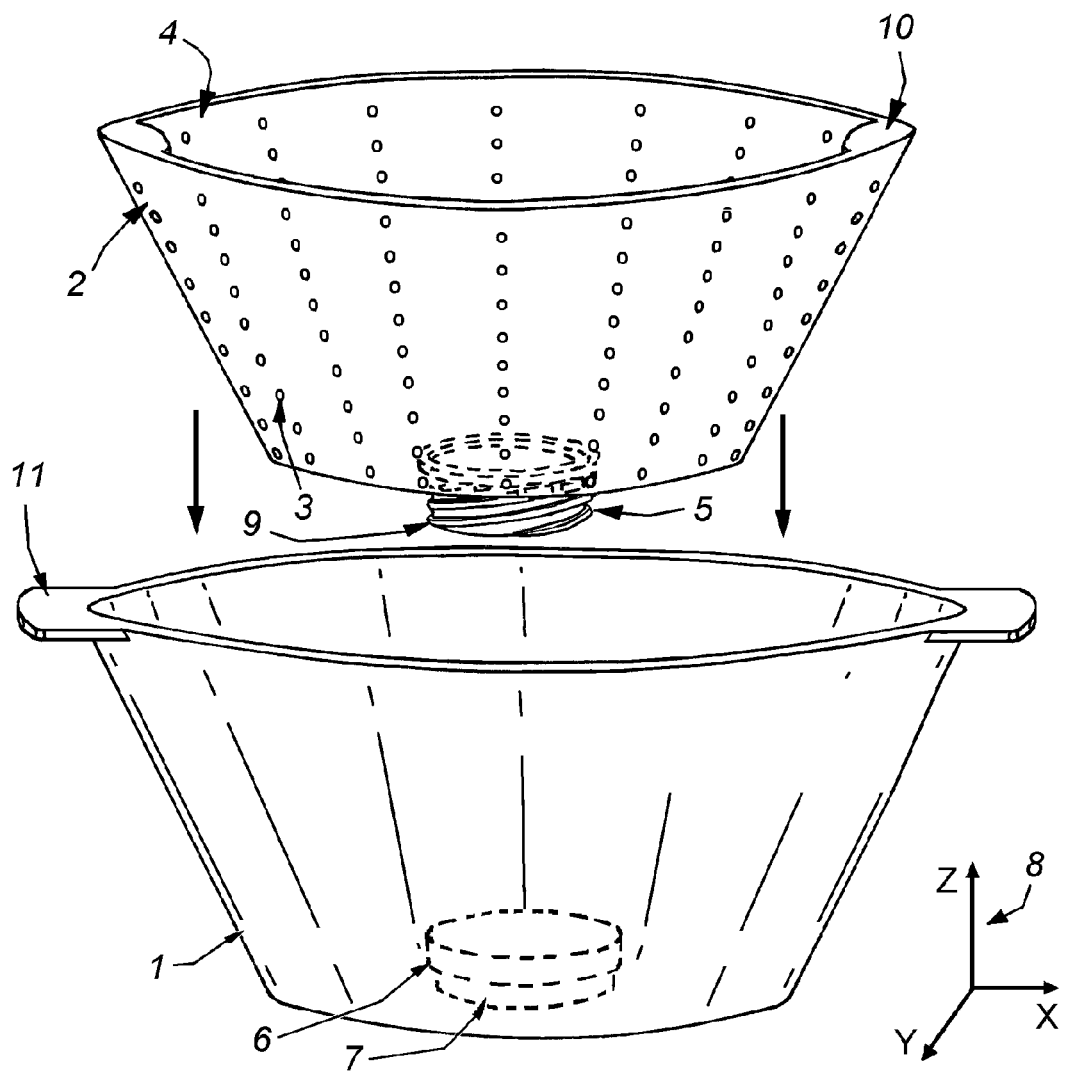
FIG. 1 shows an isometric view of the complete apparatus.
Figure 2:
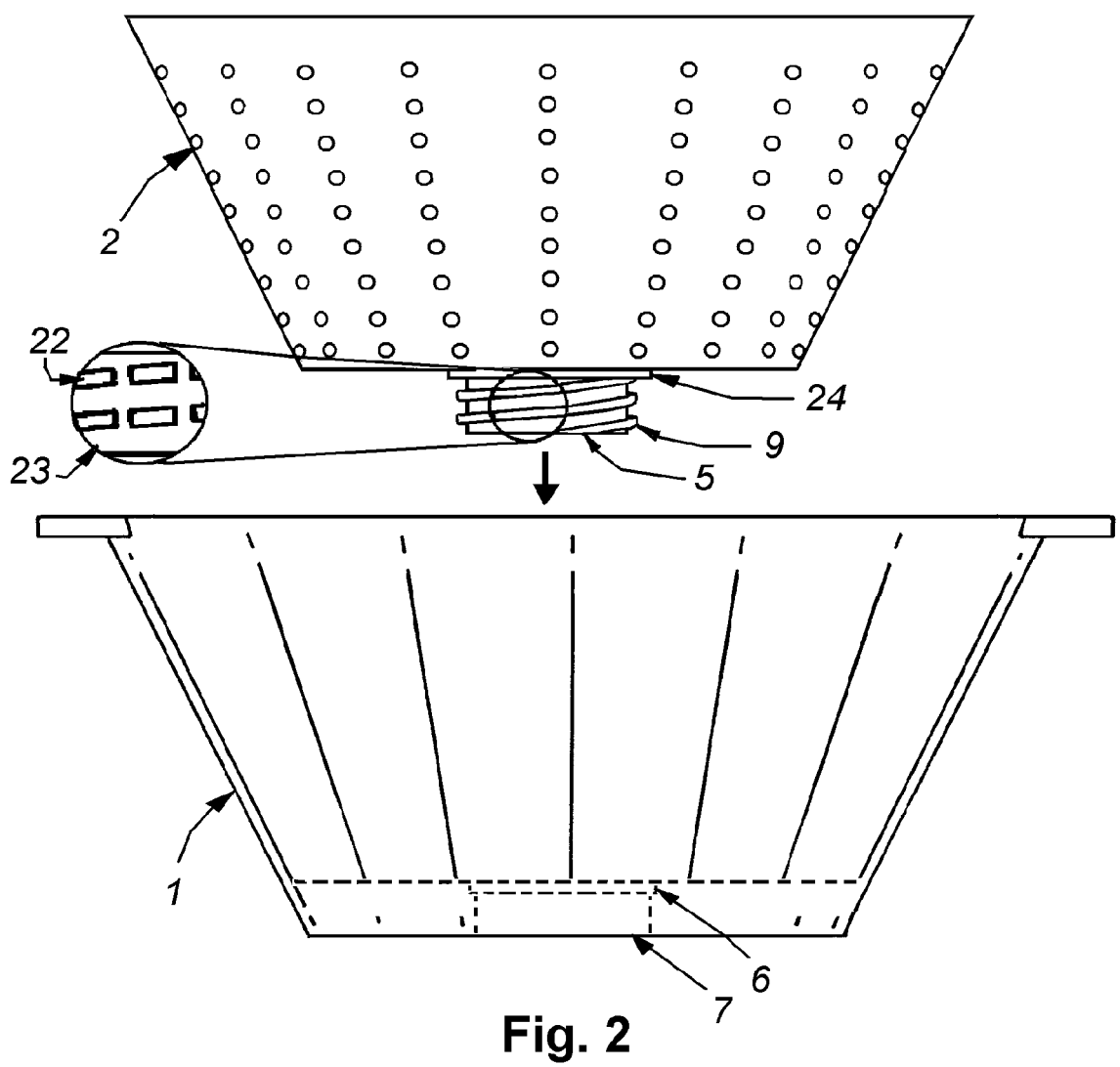
FIG. 2 is a partial cross-sectional view of the threaded embodiment apparatus.

FIG. 1 shows a view of the complete apparatus according to the preferred embodiment of this invention. It consists of an outer container 1 within which an internal colander/strainer container 2 fits. As shown in FIG. 1, this apparatus comprises an inner container or colander/strainer 2 that fits within the housing of solid wall outer container 1. Depending on the embodiment, the inner container 2 and outer container 1 may have a semi-cylindrical shape, any other suitable corresponding shape or even any other suitable non-corresponding shape, as long as they fit within each other. For example, in the preferred embodiment, the colander 2 can have any suitable shape that allows it to rotate with respect to the container 1, preferably about the vertical axis (z-axis) 8, but in alternative embodiments, the shapes may be non-rotational (such as two squares within each other, as an example) for the sealing/drain may be accomplished through vertical force (instead of rotational means).

In the preferred embodiment, this internal container is capable of performing the colander or strainer function via a series of perforations or openings 3 along its surface. These perforations may be made of various sizes, and in various locations, with the primary goal being the ability to allow for the free-flow of liquid across the walls of the inner container 2 while keeping the intended contents (solids or liquids with structural size larger than the perforations 3) within it. As such, it is conceivable and within the confines of this invention, that a multitude of colanders (each having a purpose specific sized opening or perforation 3) may be built to interface with the same outer container. While in the preferred embodiment it is desired that the gap between the inner 2 and outer 1 containers be minimized, alternate embodiments are envisioned where the inner container is built in various dimensional combinations (e.g. Small, Medium, or Large). Similarly, a non-porous (i.e. with no perforations 3) inner container may be desired.

In the preferred embodiment of the invention, the outer container 1 is equipped with a drain opening 7 that mates through a coupling mechanism 6 to the threads in the internal colander 2 protrusion 5. In any other position but closed or sealed (i.e. when the containers are turned against each other and/or all the way in), the device is in the "open" or drain position. In this position, a gap is formed between the walls of the internal container 2 and the outer container 1, and liquids flow through gravity and the colander openings 3 to collect in the bottom space formed between the inner and outer containers, and through the drain opening 7 to the outside of the outer container. When the inner container 2 is fully rotated (i.e. in the closed or sealed position), a solid seal is formed around the coupling mechanism 6, inhibiting the flow out through the drain opening 7.

In the preferred embodiment the coupling mechanism 6 utilizes a helical thread match similar to that of a bolt and a nut. An external thread 9 is formed on the inner container protrusion 5, with a corresponding internal thread in the coupling mechanism 6 above and/or around the outer container drain hole 7. To allow for the displacement of liquids past the two threads, a number of approaches may be undertaken and are envisioned here.

The simplest is to partially screw the external thread into the coupling mechanism. The preferred embodiment is for the internal thread to be formed with a fraction of the pitch (and a corresponding larger flat), of the external thread, in this manner when they are inserted in each other and in any position but fully rotated (i.e. closed), the gap between the respective threads (since the outer thread does not fully occupy the allowed space by the internal thread) will allow a channel within which the liquids drain through and out the bottom of the outer container opening. A similar effect can be created with alternate embodiments in which a deep or beveled inner thread (or a shallower external thread) are used. In the above fashions, liquids proceed to drain from this inner space to the outside of both containers, through the drain hole 7 in the outer container 1.

Upon rotation of one container relative to the other (rotation direction is dependent on the chosen direction of the thread), and without requiring the removal of the material in the inner container, the gap between the internal and external containers is minimized, and a seal formed by the pressing of the inner container 2 material to that of the outer container material 1. In an alternate embodiment, a gasket 24 may be formed or installed either at the top of the inner container protrusion 5, or at the bottom of the outer container. This would enhance the sealing properties of this critical junction in the sealed position.

In an alternate embodiment (shown in inset 23), liquid draining is accelerated by cutting vertical slots 22 at regular intervals within the external thread 20 in the inner container protrusion 5. In this embodiment, draining liquids do not have to travel around the length of the thread in a helical fashion, but may take a "shortcut" orthogonal to the threads and down the slots. Since the overall shape of the external thread 22 (in slotted form, 9 in continuous form) is unaffected (that is, the connection of all the slots still generates a helical shape), rotation of the containers relative to each other is unaffected.

Figure 3:
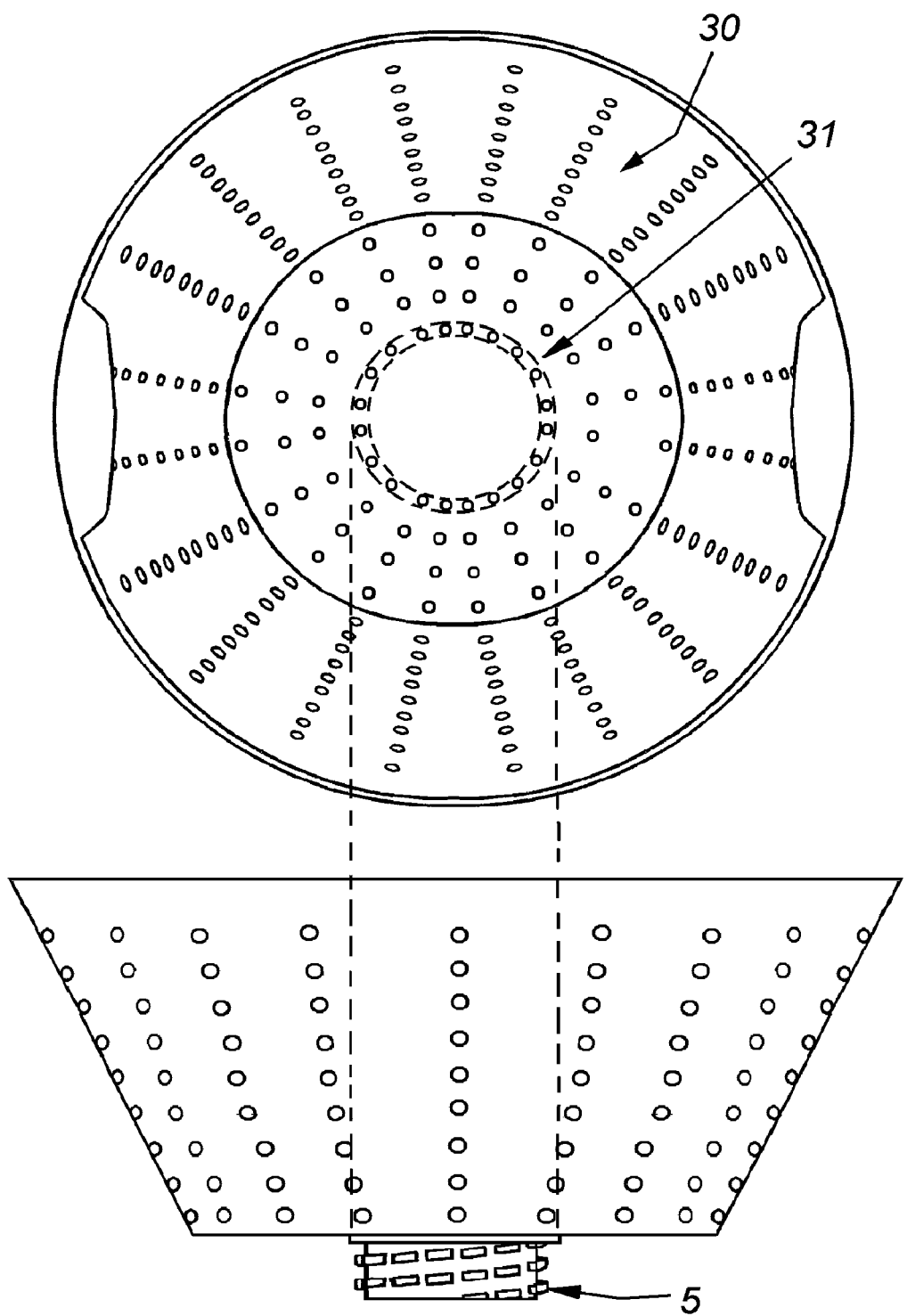
FIG. 3 shows a combination top view and side view of the threaded embodiment apparatus.
Figure 4:
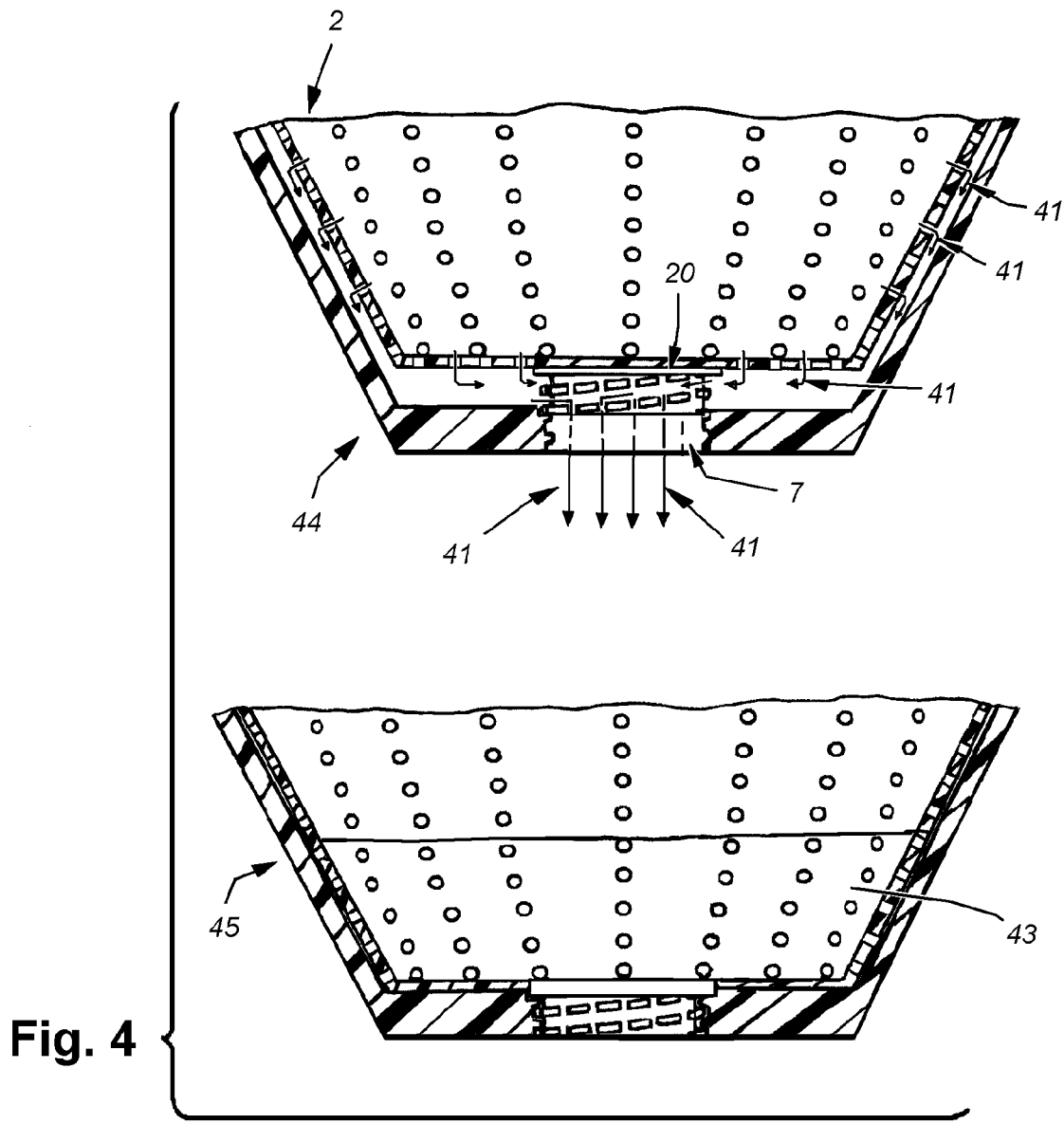
FIG. 4 illustrates the threaded embodiment apparatus in the open and closed positions.

FIG. 3 is a top/side view of the colander 2 portion of the apparatus. In it we illustrate another critical feature of the invention. While the inner container 2 may be perforated 3 in any location of its surface 30, it is critical that it remain solid within the portion of its surface 31 directly over the inner protrusion 5. In this fashion, and as seen in FIG. 4 the combination of the inner and outer containers creates a colander/strainer assembly 44 when in the "open" or "draining" position 44. In this position, the inner container 2 is either partially screwed into the outer container 1 or even free standing within it, allowing for any liquids 41 in the device to flow via the colander openings 3, the gap formed between the inner and other containers 42, the interface of the external thread 9 (or alternatively 20) and the coupling mechanism 6 (and through the external container drain opening 7), the primary support for the assembly is exercised via the coupling of the protrusion thread 22 and its mating to the receiving thread 6.

To "close" or "seal" and create a leak-proof combination container 45, in the preferred embodiment the user rotates one container vs. another in the direction of travel of the thread, allowing the inner container 2 protrusion 5 to penetrate through the coupling mechanism 6 and into the drain opening 7. Right hand screws are preferred, for among other things, it takes advantage of the preponderance of right handed humans, but in an alternative embodiment a left hand screw may be used. In the preferred embodiment, horizontal handles are provided in the inner container 10 as well as the outer container 11 to facilitate this. By not allowing the handles to protrude above the upped datum 4 of both containers, the handles flatness also allows for an optional lid to be fitted atop the combination container. In this fashion, the lid would create a sealed environment in which to store either ingredients or prepared food without external contamination.

In addition to handles, alternative embodiments may use any grip assistance means to facilitate handling, rotation and/or pushing/pulling of one container to another around the vertical axis 8 dimension These may comprise vertical or horizontal handles (inside or outside the volume of the inner container), levers, finger or tool holes.

In the preferred embodiment, the "closed" position 45 gap 42 between the two containers is reduced or minimized until the walls are touching, providing the user with an internal working surface in which the material being manipulated will remain (whether in dry, moist or wet condition 43) within the container. For this reason, it is important to ensure that the dimensions and tolerances allow for some compression around the coupling mechanism 6 when closed, in order to create a tight, liquid proof seal.

Figure 5:
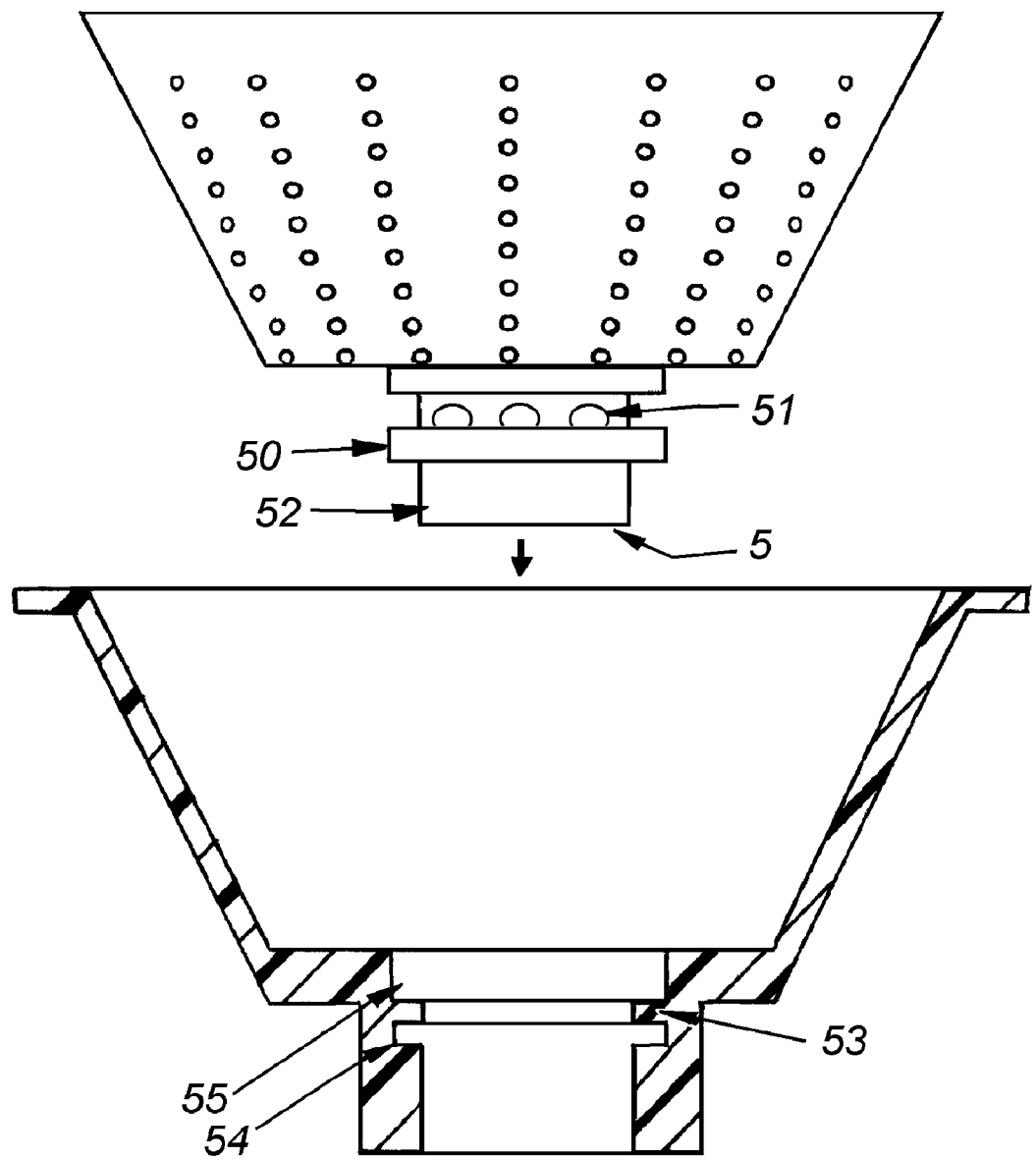
FIG. 5 is a partial cross section view of the push embodiment apparatus.

Note that the threaded protrusion is not the only way to implement the invention. FIG. 5 illustrates an alternate embodiment, where the open/close drain condition is not created by rotation between the colander 2 and outer container 1, but by displacement along the vertical axis 8. In this embodiment, the seal is created through a "push" of the inner container 2 into the outer container 1, where no rotation is required. Among other things, this would relax the requirement for the shape of the containers to allow rotation within each other seen in the preferred embodiment, although the need for them to nest within one another remains.

In this embodiment, the gasket or O-ring 50 is placed below the drain openings 51 in the protrusion 5. The protrusion itself is hollow, allowing for a path for the liquids to come through the openings 51 and down its bottom. The outer container 1 is then engineered with its own material seal 53 capable of sealing the drain openings 51, and two key gaps. The first gap 55 acts as a seat for the inner container when in the open or drain position. When the user wants the apparatus to become a leak-proof container, they push the inner container "down" (along the z-axis 8), pushing the gasket 50 past the "open" position into its "closed" positions 54, and forcing the drain seal 53 to fit around the openings 51 and close the drain, creating the leak-proof conditions that allow for the device to become a leak-proof container.

Figure 6:
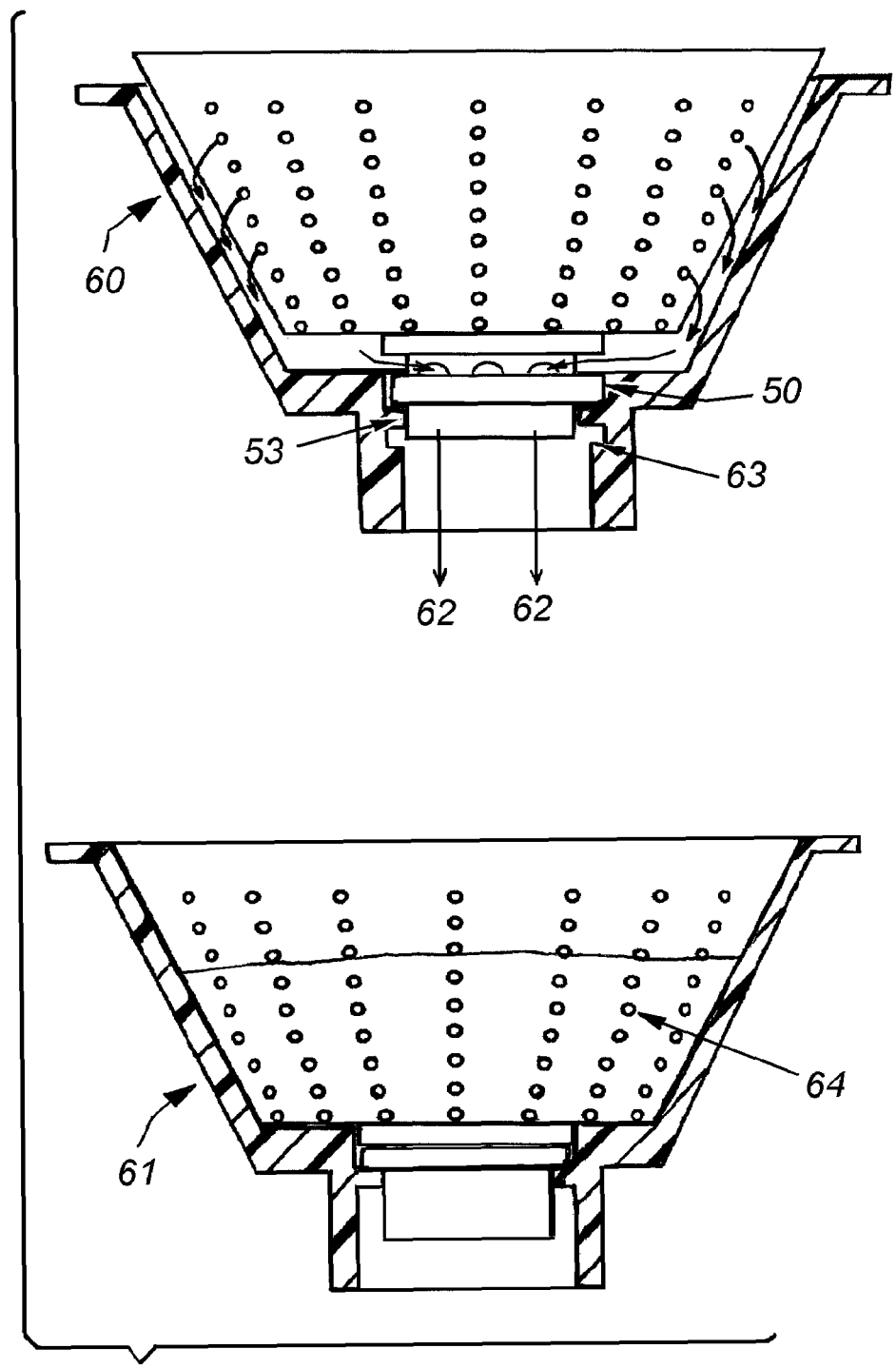
FIG. 6 illustrates the push embodiment apparatus in the open and closed positions.

The above operation is best is illustrated in FIG. 6, where we can see the open 60 and closed 61 conditions, as well as the resulting build-up of any liquids 64 within the leak-proof container in the closed position.

It should be noted, that because the leak-proof container is intended for manipulation of the contents, there is a desire to minimize the effects of the colander openings 3 on the item being manipulated while mixing or displacing it within the combined container. For this reason, and as option to all embodiments, the walls of the container may feature raised "bumps" that match the position of the drain holes in the colander portion when in the leak-proof position. Such an arrangement would present the material inside the combination container with a smooth surface, minimizing the amount of material trapped within the colander openings 3.

In the preferred embodiment, the perforations are made from a minimal level at the bottom (See FIG. 3 for a note on the required areas without perforations at the bottom) up to the top of the rim. In some applications, and as an alternate embodiment, a minimal height of perforations may be chosen that guarantees the colander retains a minimal amount of liquid. Thus, an embodiment of a purpose specific apparatus may be built. As an example, one designed for preparing macaroni and cheese with a level of perforations that guarantees a certain amount of liquid (say 2 fl. Oz) remains in the container when a specific amount of macaroni is poured in it to drain.

CONCLUSION

In concluding the detailed description, it should be noted that it would be obvious to those skilled in the art that many variations and modifications can be made to the preferred embodiment without substantially departing from the principles of the present invention. Also, such variations and modifications are intended to be included herein within the scope of the present invention as set forth in the appended claims. Further, in the claims hereafter, the structures, materials, acts and equivalents of all means or step-plus function elements are intended to include any structure, materials or acts for performing their cited functions.

It should be emphasized that the above-described embodiments of the present invention, particularly any "preferred embodiments" are merely possible examples of the implementations, merely set forth for a clear understanding of the principles of the invention. Any variations and modifications may be made to the above-described embodiments of the invention without departing substantially from the spirit of the principles of the invention. All such modifications and variations are intended to be included herein within the scope of the disclosure and present invention and protected by the following claims.

The present invention has been described in sufficient detail with a certain degree of particularity. The utilities thereof are appreciated by those skilled in the art. It is understood to those skilled in the art that the present disclosure of embodiments has been made by way of examples only and that numerous changes in the arrangement and combination of parts may be resorted without departing from the spirit and scope of the invention as claimed. Accordingly, the scope of the present invention is defined by the appended claims rather than the forgoing description of embodiments.

What is claimed is:

1. An apparatus comprising;
   an inner container whose walls contain openings suitable for draining liquids and a protrusion for mating with an outer container;
   a portable outer container with solid walls and a drain opening suitable to mate with said inner container protrusion and that is sealed by the interaction of the containers;
   said inner container and outer container being sized and configured so that the inner container can nestle substantially inside the outer container;
   said protrusion extending from said inner container being equipped with a thread that mates with the respective thread in the outer container drain opening so that when fully rotated onto one another, the threads on said protrusion having slots cut out to provide axial drain passage, the co-action with said drain opening seals the drain and provides for a leak-proof combination container in one position, and when not fully rotated there exist a variable spacing between the inner container and the outer container and a variable drain passage between said protrusion and the opening of the outer container.

2. The apparatus of claim 1 further comprising a gasket to assist in creating a better drain seal.

3. The apparatus of claim 1 further comprising grip assistance in order to facilitate rotation of one portion relative to the other.

4. A method for using a strainer and serving combination container comprising the steps of;
   providing an inner container whose walls contain openings suitable for draining liquids and a protrusion for mating with an outer container;
   providing a portable outer container with solid walls and an opening suitable to mate with said inner container protrusion;
   nesting the inner container within the outer container by partially mating the distance between the outer and inner container walls by rotating one container to another;
   using the combined container as a strainer/colander in the upright position by allowing the liquid to flow through the inner container contents, the inner container perforations and out the outer container drain opening;
   fully rotating the inner container relative to the outer container until the drain opening is sealed; and
   using the combined container as a leak-proof container.

\* \* \* \* \*